United States Patent
Miki et al.

(10) Patent No.: US 6,654,227 B2
(45) Date of Patent: Nov. 25, 2003

(54) CERAMIC ELECTRONIC PARTS AND METHOD FOR MANUFACTURING THE SAME

(75) Inventors: Takeshi Miki, Omihachiman (JP); Satoru Noda, Hikone (JP); Kunihiko Hamada, Kyoto (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

(21) Appl. No.: 10/277,882

(22) Filed: Oct. 23, 2002

(65) Prior Publication Data

US 2003/0086237 A1 May 8, 2003

(30) Foreign Application Priority Data

Oct. 26, 2001 (JP) .................................. 2001-329594

(51) Int. Cl.[7] .................................................. H01G 4/06
(52) U.S. Cl. ................ 361/321.2; 361/321.5; 361/305; 361/322
(58) Field of Search .................................. 361/303, 305, 361/306.3, 313, 311, 312, 321.2, 322, 320

(56) References Cited

U.S. PATENT DOCUMENTS

| | | | | |
|---|---|---|---|---|
| 5,245,309 A | * | 9/1993 | Kawase et al. | 338/22 R |
| 5,840,382 A | * | 11/1998 | Nishide et al. | 428/209 |
| 6,040,755 A | * | 3/2000 | Abe et al. | 338/22 R |
| 6,362,949 B1 | * | 3/2002 | Takashima et al. | 361/321.4 |
| 2002/0135972 A1 | * | 9/2002 | Higuchi et al. | 361/321.2 |

* cited by examiner

*Primary Examiner*—Anthony Dinkins
(74) *Attorney, Agent, or Firm*—Dickstein, Shapiro, Morin & Oshinsky, LLP.

(57) ABSTRACT

A ceramic electronic part includes a ceramic assemblage containing laminated plural ceramic sheets, plural inner electrodes formed between the ceramic sheets and containing Ni as a major component, and outer electrodes electrically connected to the inner electrodes. The outer electrodes contain Ag as a major component and Au and an inorganic oxide as minor components.

8 Claims, 2 Drawing Sheets

CERAMIC ELECTRONIC PARTS AND METHOD FOR MANUFACTURING THE SAME

BACKGROUND OF THE INVENTION

1. Field of the Invention

The present invention relates to ceramic electronic parts such as monolithic ceramic capacitors and monolithic positive temperature coefficient thermistors. More specifically, it relates to ceramic electronic parts including Ni inner electrodes and outer electrodes that are electrically connected to the Ni inner electrodes, contain Ag as a major component and Au and an inorganic binder as minor components.

2. Description of the Related Art

Inner electrodes of monolithic ceramic capacitors have been conventionally made of Ag, Ag—Pd, or another material. Conventional outer electrodes of these monolithic ceramic capacitors comprise a first electrode layer made of Ag that has excellent conductivity and can be baked at low temperatures, a second electrode layer made of Ni formed on the first electrode layer, and a third electrode layer made of Sn or solder formed as an outer layer to improve solderability.

However, these materials for the inner electrodes are expensive, and Ni, a less expensive base metal, has been increasingly used. However, Ni used as a material for the inner electrodes does not form a solid solution with the Ag of the first electrode layer of the outer electrodes and thereby hardly combines with the Ag constituting the outer electrodes, and the resulting monolithic ceramic capacitors may not yield a desired electric capacity.

As a possible solution to this problem, outer electrodes made of Cu that fully forms a solid solution with Ni has received attention. However, Cu is susceptible to oxidation, and a Cu-containing conductive paste must be baked in a reducing atmosphere to form the outer electrodes. In addition, the vehicle of the conductive paste is slowly decomposed during baking in such a reducing atmosphere due to a low oxygen concentration of the reducing atmosphere.

In the monolithic positive temperature coefficient thermistors, inner electrodes and ceramic sheets are concurrently fired in a reducing atmosphere, and outer electrodes are then formed by baking. By baking the outer electrodes in an air atmosphere, the monolithic positive temperature coefficient thermistors themselves are re-oxidized and thereby yield desired positive temperature characteristics of resistance. As the materials for the inner electrodes, Ni for attaining ohmic contact with n-type impurity semiconductors is preferably used. When Ni is used as the material for the inner electrodes, Ag, Al and Zn that can be baked in an air atmosphere can be used as materials for the outer electrodes.

However, when the inner electrodes comprise Ni and the outer electrodes comprises Ag alone, the inner electrodes do not form a solid solution with the outer electrodes, and they do not satisfactorily combine with each other. Specifically, the resulting positive temperature coefficient thermistors cannot significantly establish electrical connection between the inner electrodes and the outer electrodes.

Outer electrodes which comprise Al or Zn have low solderability. To improve solderability, a Ni plating layer can be formed by electroplating, but Al and Zn are eluted during electroplating.

SUMMARY OF THE INVENTION

Accordingly, an object of the present invention is to provide a ceramic electronic part including inner electrodes made of Ni, and outer electrodes that satisfactorily combine with the inner electrodes made of Ni, are formed by baking in an air atmosphere and contain Ag as a major component. Such ceramic electronic parts are used as multilayer ceramic electronic parts such as monolithic ceramic capacitors and monolithic positive temperature coefficient thermistors.

To achieve the above and other objects, the present invention provides, in one aspect, a ceramic electronic part including a ceramic assemblage containing laminated plural ceramic sheets; plural inner electrodes sandwiched between the ceramic sheets and containing Ni as a major component; and outer electrodes electrically connected to the inner electrodes, in which the outer electrodes contain Ag as a major component and Au and an inorganic oxide (an inorganic binder) as minor components.

The outer electrodes of the ceramic electronic parts of the present invention contain Ag as a major component and are formed by baking in an air atmosphere. If outer electrodes are made of Ag alone, such outer electrodes do not form a solid solution with inner electrodes made of Ni. However, in the aforementioned outer electrodes containing Ag as a major component and Au as a minor component, a solid solution can be formed between Ni and Ag by the medium of Au. Accordingly, the outer electrodes can satisfactorily combine with the inner electrodes. The term "major component" as used herein means a component that is contained in the largest amount in the electrodes in question.

The content of Au in the outer electrodes is preferably equal to or more than about 0.1 part by weight relative to 100 parts by weight of Ag. If the content of Au in the outer electrodes is less than about 0.1 part by weight, Ni constituting the inner electrodes may not form a solid solution with Ag constituting the outer electrodes, and an electrical contact resistance may be observed.

In contrast, if the content of Au is equal to or more than about 40 parts by weight relative to 100 parts by weight of Ag, the sintering properties of the outer electrode may be deteriorated and conductivity may be decreased.

The inorganic oxide can be lead borosilicate glass but is preferably lead-free glass from the viewpoint of toxic substance control. Such lead-free glass includes, for example, bismuth borate glass, bismuth borosilicate glass, zinc borosilicate glass and mixtures thereof.

The glass for use herein preferably has such a viscosity at high temperatures that its working point (log $\eta[Pa.s]=4$) is equal to or lower than about 600° C., since the baking temperature of Ag is from about 600° C. to 800° C., and it is preferred that the electrodes are formed by sintering a liquid phase.

The content of the inorganic oxide is preferably equal to or more than about 1% by volume and less than or equal to about 20% by volume based on the total solid contents. If the content is less than about 1% by volume, the electrodes may not have sufficient adhesive strength, and if it exceeds about 20% by volume, the electrodes may lose their conductivity.

The ceramic electronic parts include, for example, monolithic ceramic capacitors and monolithic positive temperature coefficient thermistors.

The present invention also provides, in another aspect, a method for manufacturing such ceramic electronic parts. The method includes the steps of preparing a ceramic green assemblage including plural ceramic green sheets and plural conductive paste sheets for inner electrodes, the ceramic green sheets including a powdery ceramic material, and the conductive paste sheets being sandwiched between the ceramic sheets and containing Ni as a major component; firing the ceramic green assemblage in a non-oxidizing atmosphere to thereby yield a ceramic sintered compact including ceramic sheets and inner electrodes sandwiched between the ceramic sheets; applying a conductive paste for outer electrodes to surfaces of the ceramic sintered compact where the inner electrodes are exposed, the conductive paste containing Ag as a major component and Au and an inorganic oxide as minor components; and baking the conductive paste for outer electrodes in an atmosphere containing oxygen to thereby yield outer electrodes conductively connected to the inner electrodes.

The present invention having the above configuration can provide ceramic electronic parts having Ni inner electrodes and outer electrodes that are formed by baking in an air atmosphere and are electrically satisfactorily connected to the inner electrodes.

DESCRIPTION OF THE PREFERRED EMBODIMENTS

First Embodiment

A ceramic electronic part as an embodiment of the present invention will be illustrated with reference to FIG. 1.

Figure 1:
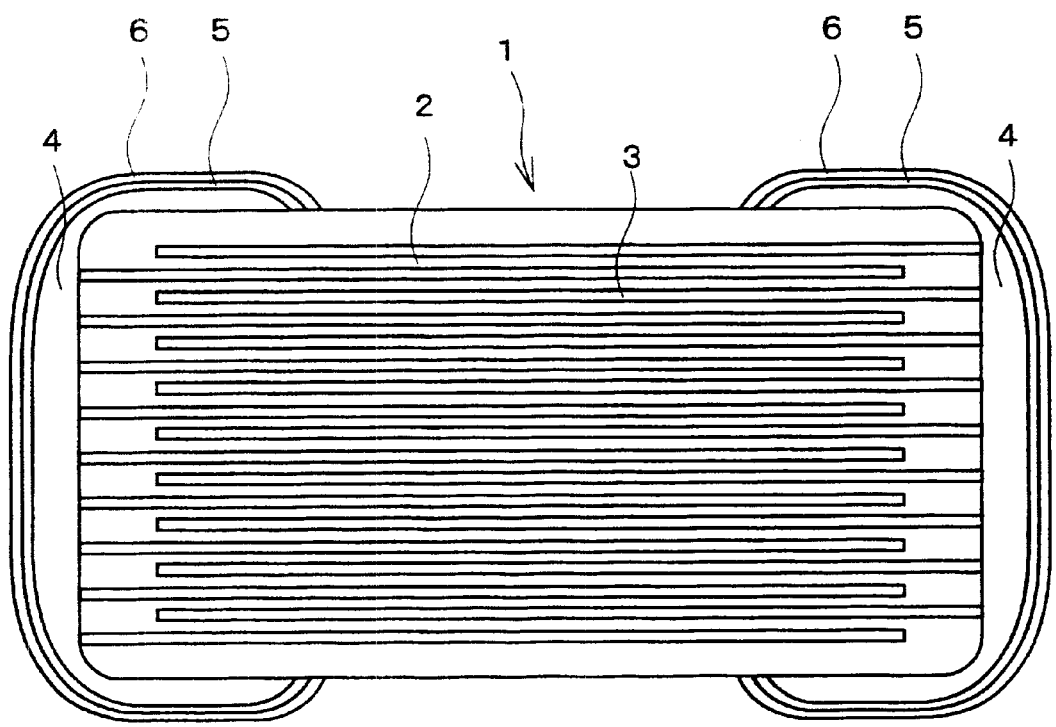
FIG. 1 is a sectional view of a monolithic ceramic capacitor as an embodiment of ceramic electronic parts of the present invention.

FIG. 1 shows a monolithic ceramic capacitor 1 according to the present embodiment comprises an approximately rectangular parallelepiped assemblage including plural dielectric layers 2 laminated with inner electrodes 3 made of Ni. Outer electrodes 4 are formed at both ends of the assemblage so as to be in contact with the inner electrodes 3. The monolithic ceramic capacitor 1 also comprises Ni plating layers 5 formed so as to cover the outer electrodes 4, and Sn plating layers 6 formed on the Ni plating layers 5 to improve solderability. The Sn plating layers 6 may be layers made of solder.

Second Embodiment

A ceramic electronic part according to another embodiment of the present invention will be illustrated with reference to FIG. 2.

Figure 2:
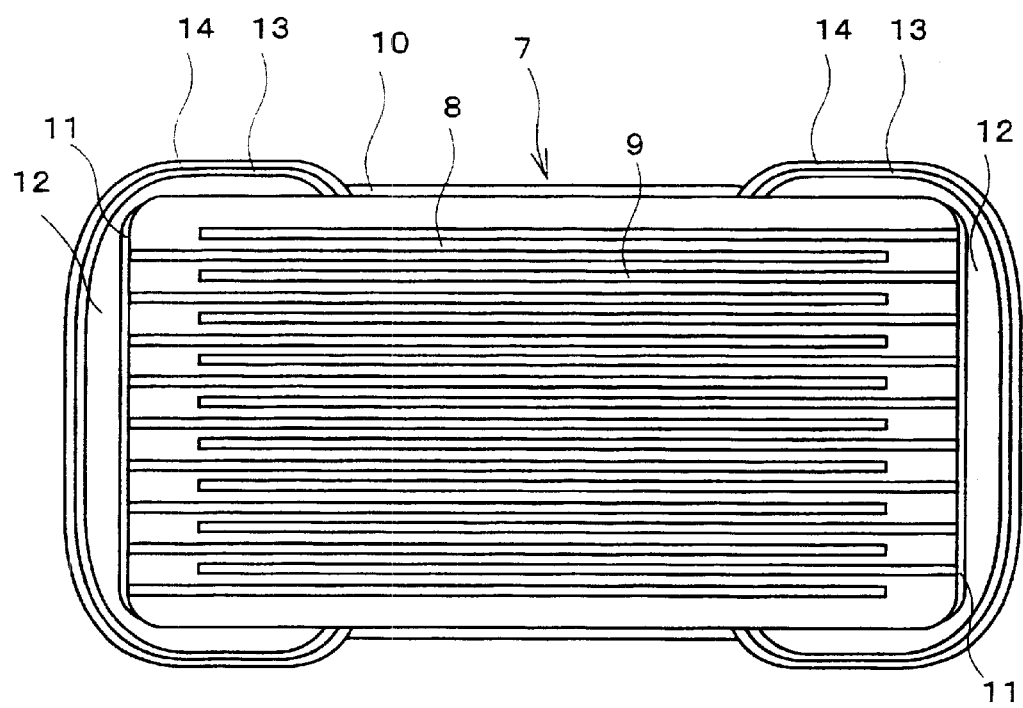
FIG. 2 is a sectional view of a monolithic positive temperature coefficient thermistor as another embodiment of the ceramic electronic parts of the present invention.

FIG. 2 shows a monolithic positive temperature coefficient thermistor 7 of the present embodiment comprises an approximately rectangular parallelepiped assemblage including plural semiconductor layers 8 laminated with inner electrodes 9 made of Ni. End outer electrodes 11 made of Ni, the same as inner electrodes 9, are formed on the inner electrodes 9 so as to stabilize the junction therebetween. Outer electrodes 12 are formed from a conductive paste on the end outer electrodes 11. The monolithic positive temperature coefficient thermistor 7 further comprises Ni plating layers 13 to cover the outer electrodes 12, and Sn plating layers 14 formed on the Ni plating layers 13 to improve solderability. The Sn plating layers 14 may be layers made of solder. The monolithic positive temperature coefficient thermistor 7 further comprises a glass layer 10 formed on the surface of the assemblage (ceramic assemblage).

EXAMPLES

The present invention will be illustrated in further detail with reference to several examples and comparative examples below, which are not intended to limit the scope of the invention.

Examples 1 to 5 and Comparative Example 1

In these examples and comparative example, a chip-type monolithic ceramic capacitor is taken as an example of ceramic electronic parts.

Initially, predetermined amounts of starting materials $TiCl_4$ and $Ba(NO_3)_2$ were weighed, and were added to an aqueous oxalic acid solution to thereby yielded a precipitation of barium titanyl oxalate ($BaTi(C_2O_4) \cdot 4H_2O$). The precipitate was heated and decomposed at high temperatures of equal to or higher than 1000° C. and thereby yielded $BaTiO_3$.

Oxides, carbonates and hydroxides of metallic components were weighed to give a molar composition of $0.25Li_2O \text{-} 0.65(0.30TiO_2 \text{-} 0.70SiO_2) \text{-} 0.10Al_2O_3$, and the weighed materials were mixed and pulverized to thereby yield a powder of a first minor component.

Separately, oxides, carbonates and hydroxides of metallic components were weighed to give a molar composition of $0.66SiO_2 \text{-} 0.17TiO_2 \text{-} 0.15BaO \text{-} 0.02MnO$, and the weighed materials were mixed and pulverized to thereby yield a powder of a second minor component.

Each of the powders of first and second minor components was placed in a platinum crucible, was heated to 1500° C., was quenched, and was pulverized to thereby yield oxide powders of first and second minor components having an average grain size of less than or equal to 1 $\mu$m, respectively.

The first and second minor component oxide powders were weighed and added to a predetermined amount of the $BaTiO_3$, and the mixture was wet-mixed in a ball mill with a poly(vinyl butyral) binder and an organic solvent serving as a binder, such as ethanol, and thereby yielded a ceramic slurry. The ceramic slurry was formed into sheets by a doctor blade process and thereby yielded rectangular ceramic green sheets each 35 $\mu$m thick.

Next, a conductive paste containing Ni as a major component was applied to each of the ceramic green sheets by printing to thereby yield conductive paste layers for constituting inner electrodes. In this process, each of the conductive paste layers was drawn from one end of the ceramic green sheet in a longitudinal direction.

Plural plies of the ceramic green sheets each carrying the conductive paste layer were laminated in such a manner that the sides to which the conductive paste layer was exposed were arrayed in a staggered configuration and thereby yielded an assemblage. The assemblage was heated at 350° C. in an atmosphere of $N_2$ gas to thereby decompose the binder. The assemblage was then fired at 1300° C. in a reducing atmosphere containing $H_2\text{—}N_2\text{—}H_2O$ gas at an oxygen partial pressure of $10^{-9}$ to $10^{-12}$ MPa for 2 hours and thereby yielded a ceramic sintered compact.

A conductive paste (an Ag conductive paste) containing Ag as a major component and Au and zinc borosilicate glass as minor components was applied to end faces of the ceramic sintered compact where the inner electrodes were exposed. The applied conductive paste was then baked at 800° C. in an air atmosphere for 1 hour and thereby yielded outer electrodes. In addition, a Ni plating layer and a Sn plating layer were formed on the outer electrodes in this order and thereby yielded a monolithic ceramic capacitor. In this manner, monolithic ceramic capacitors were prepared according to Examples 1 to 5 and Comparative Example 1 with a varying content of Au in the Ag conductive paste as shown in Table 1.

The electric capacities and dielectric losses of the above-prepared monolithic ceramic capacitors were determined, and the results are shown in Table 1. As a comparative example, a monolithic ceramic capacitor comprising outer electrodes formed from a Ag conductive paste containing no Au (Comparative Example 1) was prepared and tested. The result is also shown in Table 1. In these tests, monolithic ceramic capacitors having an electric capacity of equal to or more than 15 nF and a dielectric loss of less than or equal to 4% are determined as good monolithic ceramic capacitors herein.

TABLE 1

|  | Au content (parts by weight) | Electric capacity (nF) | Dielectric loss (%) |
| --- | --- | --- | --- |
| Com. Ex. 1 | 0 | 11.3 | 4.57 |
| Example 1 | 0.1 | 19.8 | 2.56 |
| Example 2 | 5.0 | 21.9 | 2.48 |
| Example 3 | 15.0 | 21.5 | 2.62 |
| Example 4 | 30.0 | 20.1 | 2.81 |
| Example 5 | 40.0 | 15.0 | 3.51 |

Table 1 shows that monolithic ceramic capacitors having satisfactory properties of high electric capacities and low electric losses can be obtained by incorporating Au into the Ag conductive paste, preferably in an amount of equal to or more than about 0.1 part by weight and less than about 40 parts by weight relative to 100 parts by weight of Ag.

Examples 6 to 10 and Comparative Example 2

In these examples and comparative example, a chip-type monolithic positive temperature coefficient thermistor is taken as an example of ceramic electronic parts.

Initially, starting material powders $BaCO_3$, $TiO_2$, and $Sm_2O_3$ were weighed, and mixed to thereby yield a powder having a composition of $(Ba_{0.9998}Sm_{0.0002})TiO_3$.

The prepared powder was then mixed and pulverized with pure water using zirconia balls for 16 hours, was dried and was calcined at 1200° C. for 2 hours. The calcined powder was mixed with an organic binder, a dispersing agent, and pure water using zirconia balls for several hours and was formed into ceramic green sheets.

Next, a conductive paste containing Ni as a major component was applied to each of the ceramic green sheets by, for example, printing to thereby yield inner electrode layers. The ceramic green sheets carrying the inner electrode layers were laminated so that the inner electrode layers faced each other with the interposition of each ceramic green sheet. In addition, ceramic green sheets for protection were placed so as to sandwich the laminated ceramic green sheets, the laminated article was cut to a predetermined size and thereby yielded an assemblage (a green chip). A Ni paste was then applied to end faces of the assemblage (green chip) by, for example, dipping, and was dried to thereby yield end Ni layers. The resulting article was fired at 1200° C. in a reducing atmosphere of 3% hydrogen gas in nitrogen gas and thereby yielded an assemblage having inner electrodes 9 and end outer electrodes 11 as shown in FIG. 2.

The assemblage was immersed in an aqueous solution containing glass, was dried, and was heated at 500° C. to 600° C. to thereby yield a glass layer 10 having a thickness of about 0.5 to about 5 μm. The glass has a softening point of 500° C. to 800° C. lower than the baking temperature of an electrode material mentioned later and a working temperature of 800° C. to 1150° C. higher than the baking temperature.

Next, a conductive paste (Ag conductive paste) containing Ag as a major component and Au and zinc borosilicate glass as minor components was applied to the end outer electrodes 11 of the assemblage (sintered chip) carrying the formed glass layer. The applied conductive paste was dried, and was baked at 700° C. in an air atmosphere for 1 hour to thereby yield outer electrodes 12. Subsequently, Ni plating and Sn plating were applied to the outer electrodes 12 in this order and thereby yielded a monolithic positive temperature coefficient thermistor. In this manner, monolithic positive temperature coefficient thermistors were prepared according to Examples 6 to 10 and Comparative Example 2 which a varying content of Au in the Ag conductive paste as shown in Table 2.

The initial resistances R25 and resistance changes at 130° C. to 150° C. ($\alpha_{130-150}$) of the above-prepared monolithic positive temperature coefficient thermistors were determined, and the results are shown in Table 2. As a comparative example, a monolithic positive temperature coefficient thermistor comprising outer electrodes formed from a Ag conductive paste containing no Au (Comparative Example 2) was prepared and tested, and the results are also shown in Table 2. In these tests, monolithic positive temperature coefficient thermistors having an initial resistance R25 of around 0.1Ω (+0.3Ω, −0.05Ω), exhibiting a positive temperature characteristics of resistance and having a resistance change $\alpha_{130-150}$ of equal to or more than 8 are determined as good monolithic positive temperature coefficient thermistors.

TABLE 2

|  | Au content (part by weight) | Initial resistance R25 (Ω) | Resistance change $\alpha_{130-150}$ |
| --- | --- | --- | --- |
| Com. Ex. 2 | 0 | 2.95 | 9.3 |
| Example 6 | 0.1 | 0.11 | 10.3 |
| Example 7 | 5.0 | 0.10 | 10.2 |
| Example 8 | 15.0 | 0.09 | 10.4 |
| Example 9 | 30.0 | 0.11 | 10.1 |
| Example 10 | 40.0 | 0.35 | 8.1 |

Table 2 shows that monolithic positive temperature coefficient thermistors with less varying initial resistances having satisfactory positive temperature characteristics of resistance can be obtained by incorporating Au into the Ag conductive paste, preferably in an amount of equal to or more than about 0.1 part by weight and less than about 40 parts by weight relative to 100 parts by weight of Ag.

While the present invention has been described with reference to what are presently considered to be the preferred embodiments, it is to be understood that the invention is not limited to the disclosed embodiments. On the contrary, the invention is intended to cover various modifications and equivalent arrangements included within the sprit and scope of the appended claims. The scope of the following claims is to be accorded the broadest interpretation so as to encompass all such modifications and equivalent structures and functions.

What is claimed is:

1. A ceramic electronic part comprising:

a ceramic assemblage comprising laminated plural ceramic sheets; at least two inner electrodes each of which is disposed between a pair of ceramic sheets and contains Ni as a major component; and outer electrodes electrically connected to the inner electrodes, wherein the outer electrodes comprise Ag as a major component and Au and an inorganic oxide as minor components, wherein the amount of Au is equal to or more than about 0.1 part by weight and less than about 40 parts by weight relative to 100 parts by weight of Ag.

2. The ceramic electronic part according to claim 1, wherein the inorganic oxide is one selected from the group consisting of bismuth borate glass, bismuth borosilicate glass, zinc borosilicate glass, and mixtures thereof.

3. The ceramic electronic part according to claim 1, wherein the inorganic oxide is a glass having a viscosity such that its working point is equal to or lower than about 600° C.

4. The ceramic electronic part according claim 3, which is a monolithic ceramic capacitor.

5. The ceramic electronic part according to claim 3, which is a monolithic positive temperature coefficient thermistor.

6. The ceramic electronic part according to claim 1, which is a monolithic positive temperature coefficient thermistor.

7. The ceramic electronic part according to claim 1, which is a monolithic ceramic thermistor.

8. A monolithic ceramic capacitor comprising:
- a ceramic assemblage comprising laminated plural ceramic sheets; at least two inner electrodes each of which is disposed between a pair of ceramic sheets and contains Ni as a major component; and
- outer electrodes electrically connected to the inner electrodes, wherein the outer electrodes comprise Ag as a major component and Au and an inorganic oxide as minor components.

* * * * *